(12) United States Patent
Gu et al.

(10) Patent No.: US 7,379,450 B2
(45) Date of Patent: May 27, 2008

(54) SYSTEM AND METHOD FOR PEER-TO-PEER MULTI-PARTY VOICE-OVER-IP SERVICES

(75) Inventors: Xiaohui Gu, Chappaqua, NY (US); Zon-Yin Shae, South Salem, NY (US); Zhen Wen, Chappaqua, NY (US); Philip S. Yu, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 190 days.

(21) Appl. No.: 11/372,634

(22) Filed: Mar. 10, 2006

(65) Prior Publication Data

US 2007/0211703 A1 Sep. 13, 2007

(51) Int. Cl.
*H04L 12/66* (2006.01)

(52) U.S. Cl. ............ 370/352; 370/356; 370/261; 707/100

(58) Field of Classification Search ......... 370/261, 370/356, 352; 707/100
See application file for complete search history.

(56) References Cited

U.S. PATENT DOCUMENTS

| | | | |
|---|---|---|---|
| 2003/0204509 A1* | 10/2003 | Dinker et al. ............ | 707/100 |
| 2006/0114847 A1* | 6/2006 | Dssouli et al. ............ | 370/261 |
| 2006/0146737 A1* | 7/2006 | Ohrstrom Sandgren et al. ............ | 370/261 |

OTHER PUBLICATIONS

Chu, et al., "Enabling Conferencing Applications on the Internet Using an Overlay Multicast Architecture," Proc. Of ACM SIGCOMM, pp. 55-67, San Diego, CA, Aug. 2001.
Deering, Multicast Routing in Internetworks and Extended lans, Proc. Of ACM SIGCOMM, pp. 55-64, Stanford, CA, Aug. 1998.
Lennox, et al., "A Protocol for Reliable Decentralized Conferencing," Proc. Of ACM International Workshop on Network and Operating Systems Support for Digital Audio and Video (NOSSDAV'03), pp. 72-81, Monterey, CA, Jun. 2003.
Radenkosvic, et al., "Multi-Party Distributed Audio Service with TCP Fairness," Proc. Of ACM Multimedia 2002, pp. 11-20, Juan-les-Pins, France, Dec. 2002.

(Continued)

*Primary Examiner*—Len Tran
*Assistant Examiner*—Phung-Hoang J Nguyen
(74) *Attorney, Agent, or Firm*—Jeffrey N. Giunta; Fleit Kain Gibbons Gutman Bongini & Bianco P.L.

(57) ABSTRACT

A system, method, and computer program product for establishing multi-party VoIP conference audio calls in a distributed, peer-to-peer network where any number of nodes are able to arbitrarily and asynchronously start or stop producing audio output to be mixed into a single composite audio stream that is distributed to all nodes. A single distribution tree is used that has optimal communications characteristics to distribute the composite audio signal to all nodes. An audio mixing tree is established and maintained by adaptively and dynamically adding and merging intermediate mixing nodes operating between user nodes and the root of the single distribution tree. The intermediate mixing nodes and the root of the single distribution tree are all hosted, in an exemplary embodiment, on user nodes that are endpoints of the distribution tree.

9 Claims, 10 Drawing Sheets

OTHER PUBLICATIONS

Singh, et al., Using Session Initiation Protocol to Build Context-Aware VoIP Support for Multiplayer Networked Games, Proc. Of SIGCOMM 2004 Workshops, pp. 98-105, Portland, Oregon, Aug. 2004.

Gu, Xiaohui, et al, "Supporting Multi-Party Voice-Over-IP Services With Peer-to-Peer Stream Processing", MM'05, Nov. 6-11, 2005, Singapore, Copyright 200, ACM 1-59593-044-2/05/0011.

* cited by examiner

SYSTEM AND METHOD FOR PEER-TO-PEER MULTI-PARTY VOICE-OVER-IP SERVICES

FIELD OF THE INVENTION

The present invention generally relates to the field of telecommunications, and more particularly relates to multi-party voice communications among multiple locations.

BACKGROUND OF THE INVENTION

Traditional multi-party conferencing systems generally employ one of two common multi-party communications techniques: (1) IP-layer/application-layer multicast, or (2) centralized audio mixing using H.323 multi-point control units (MCUs). In the first of these techniques, i.e., the multicast approach, the system distributes multiple audio streams concurrently from all active speakers to all participants. Although multicast is well suited for broadcast applications that usually involve one active speaker, it becomes inefficient for interactive and spontaneous applications (e.g., on-line gaming) that often include many simultaneous speakers. A multicast system can become overloaded by processing many audio streams concurrently. Moreover, separate multicast trees must be maintained for all participants at all times since it is not possible to predict which participants will become speakers as time progresses.

The second technique, i.e., the audio mixing scheme, can effectively reduce the number of concurrent streams because it first mixes the audio streams of all active speakers into a single stream and then distributes the mixed stream to all participants. However, the centralized, server-based audio mixing processing (e.g., the processing of the MCUs) cannot achieve the desired scalability and cost-effectiveness in peer-to-peer environments where the multi-party VoIP service is most applicable. Current distributed audio mixing systems use a Coupled Distributed Processing (CDP) approach that uses the same tree for both stream mixing and distribution. However, multi-party VoIP services usually present asymmetric properties: (1) the number of active speakers (i.e., stream sources) is different from the number of listeners (e.g., stream receivers), and (2) the in-bound bandwidth of a processing node is often different from its out-bound bandwidth. The asymmetrical bandwidth of a processing node is found in many Internet connections, such as, for example, in broadband over cable networks and Digital Subscriber Lines (DSL). As an example, a system may determine an optimal mixing tree for a given network topology to communicate audio source signals from all of the "speaking" nodes to a central mixing node. This optimal "mixing" tree, however, may not also correspond to the best distribution tree for communicating audio source signals from that mixing node to the all of the participating nodes that are to receive the composite audio source. This asymmetry makes the CDP approach sub-optimal due to its using the same tree for both mixing and distribution.

Therefore a need exists to overcome the problems with the prior art as discussed above.

SUMMARY OF THE INVENTION

Briefly, in accordance with the present invention, a method for providing multi-party voice-over-IP services includes establishing a peer-to-peer distribution tree to broadcast a composite audio signal from a root mixing node to a plurality of participating nodes. A subset of the participating nodes are originating nodes that provide a respective audio stream output that is received by the root mixing node in order to produce the composite audio signal. The method further includes identifying, independently of the peer-to-peer distribution tree, a first intermediate mixing node and a backup intermediate mixing node from within the plurality of participating nodes. The first intermediate mixing node provides to the root mixing node a mixing of respective audio stream outputs provided by a first subset of originating nodes to the first intermediate mixing node. The method further includes monitoring, at the backup intermediate mixing node, a first status of the first intermediate mixing node. The first status in some embodiments of the present invention includes an operational status and/or communications connectivity status of the first intermediate mixing node. The method also includes assigning, in response to the first status, the first subset of originating nodes to the backup intermediate mixing node, thereby causing the backup intermediate mixing node to provide a mixing of respective audio stream outputs provided by the first subset of originating nodes to the root mixing node.

Further in accordance with the present invention, a peer-to-peer processing node for participating in multi-party voice-over-IP services includes a distribution tree processor that establishes a peer-to-peer distribution tree to broadcast a composite audio signal from a root mixing node to a plurality of participating nodes. A subset of the participating nodes are originating nodes that provide a respective audio stream output received by the root mixing node to produce the composite audio signal. The peer-to-peer processing node further includes a mixing tree processor that identifies, independently of the distribution tree, a first intermediate mixing node and a backup intermediate mixing node from within the plurality of participating nodes. The peer-to-peer processing node also includes a mixer that provides to the root mixing node a mixing of respective audio stream outputs provided by a first subset of originating nodes to the mixer. The peer-to-peer processing node also includes a primary mixing monitor that monitors, at the backup intermediate mixing node, a first status of the first intermediate mixing node. The peer-to-peer processing node further includes a child node controller that assigns, in response to the first status, the first subset of originating nodes to the backup intermediate mixing node, thereby causing the backup intermediate mixing node to provide a mixing of respective audio stream outputs provided by the first subset of originating nodes to the root mixing node.

Exemplary embodiments of the present invention advantageously provide peer-to-peer multi-party Voice over Internet Protocol (VoIP) networking systems that efficiently support distribution to all participants of a composite audio signal containing a mixing of audio signals from an arbitrary number of multiple simultaneous speakers, were individual speakers are able to freely and independently start and stop speaking.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

DETAILED DESCRIPTION

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

Figure 1:
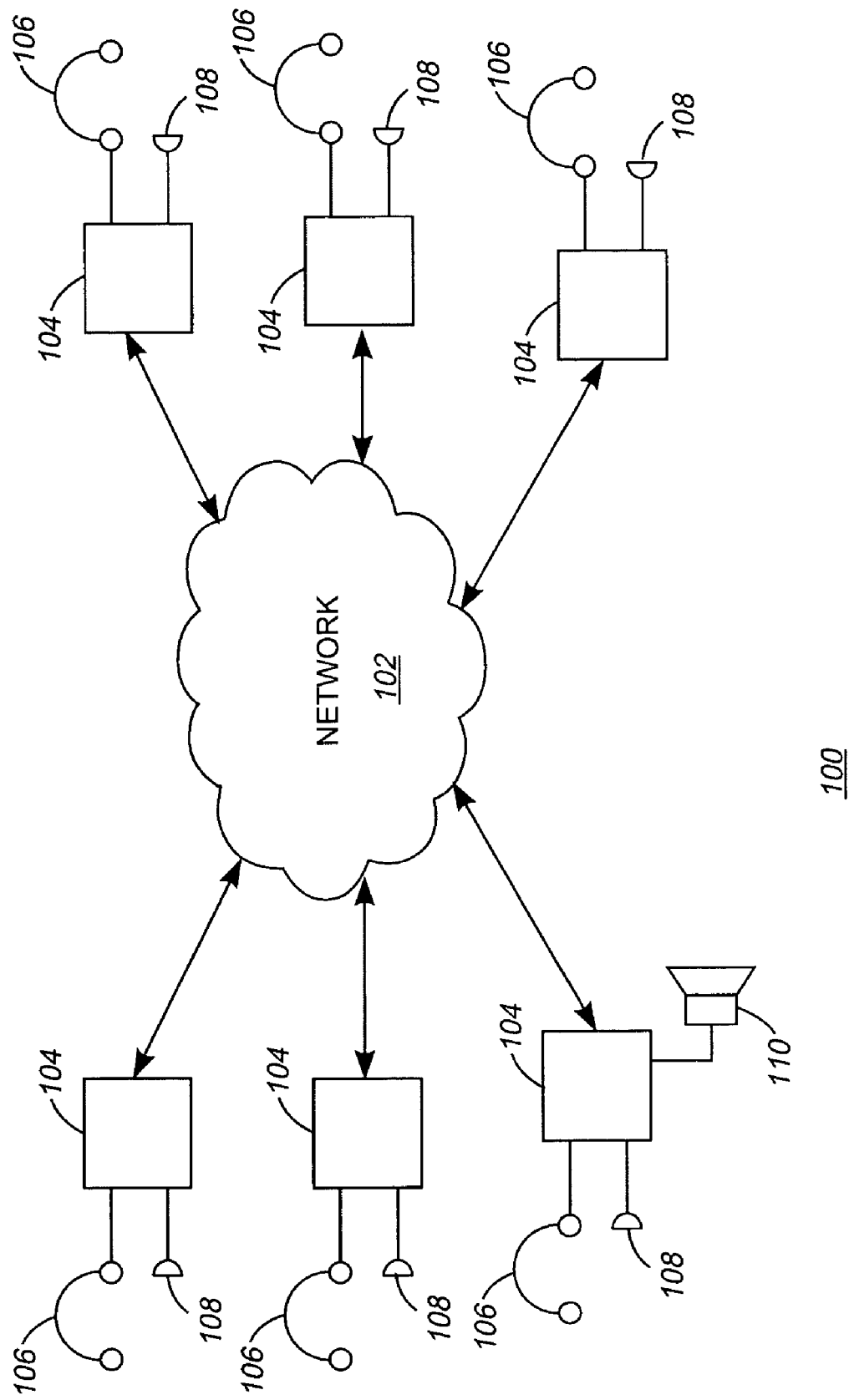
FIG. 1 illustrates a block diagram of an exemplary multi-party voice/data communications system according to an embodiment of the present invention.

FIG. 1 illustrates a block diagram of an exemplary multi-party voice/data communications system 100 according to an embodiment of the present invention. The exemplary multi-party voice/data communications system 100 includes a number of processing nodes 104 that are able to communicate data to each other through a network 102. The various processing nodes 104 are able to be physically located either relatively close to one another, at great geographical distances from one another, or some are able to be close to each other while others are simultaneously able to be geographically remote from other processing nodes 104.

The processing nodes 104 of this exemplary embodiment include microphones 108 and headsets 106 to allow a user of the processing node 104 to engage in voice communications with other processing nodes 104. Some processing nodes further include a loudspeaker 110. Sound information collected by, for example, microphone 108, is digitized and communicated across the network 102 to other processing nodes 104. The processing nodes 104 of the exemplary embodiment receive digitized sound data from the network 102 and replay that information through an attached headset 106 or loudspeaker 110.

The processing nodes 104 of the various embodiments of the present invention are able to be any suitable type of processing node. For example, game consoles, dedicated voice processing devices, conventional computer processors, music or specialized sound replay or generation devices, and any other type sound processing device is able to be used as a processing node 104. Although a microphone 108 and headset 106 are illustrated for this exemplary embodiment, other sound pick-up or any type of generation systems are able to be used as sound sources by various embodiments of the present invention. Other sound playback or recording devices, such as loudspeakers, digital sound recorders, and the like are also able to be uses in place of or in addition to the headsets 106.

The network 102 of the exemplary embodiment is able to be any suitable data network used to connect multiple processing nodes 104, such as, for example, the Internet, a private intranet, a private wide area network (WAN) or combinations of these data communications systems. The network 102 of the exemplary embodiment is able to use any type or combination of types of data communications techniques, such as wired, radio, infra-red, terrestrial wireless, satellite relayed wireless or any other suitable type of data communications links. Although the processing nodes 104 illustrated above are able to receive and transmit audio signals, further embodiments of the present invention are able to include processing nodes 104 that do not send source audio signals.

The exemplary multi-party voice/data communications system 100 allows any number of processing nodes 104 to participate in a multiple party Voice over Internet Protocol (VoIP) conference type call where all participating nodes 104 receive a composite audio signal that contains a mixed audio signal containing all audio signals sent by originating nodes. In the context of this description of the exemplary embodiment of the present invention, participating nodes include processing nodes 104 that receive or transmit audio data signals from or to other processing nodes 104. In this context, originating nodes include processing nodes 104 that are currently sending source audio data that is to be distributed to other processing nodes 104.

The operation of the multi-party voice/data communications system 100 allows any subset of the processing nodes 104, from zero to the total number of participating nodes, to be originating nodes that actively send a source audio signal to be received by the root mixing node to be mixed into the composite audio signal that is to be distributed to all participating nodes 104. Each participating node 104 of the exemplary embodiment is also able to be an originating node, and each originating node is able to arbitrarily and independently start or stop its transmission of source audio signals to be mixed into the composite audio signal. The operation of the multi-party voice/data communications system 100 efficiently supports mixing the audio signals that originate from the arbitrarily and independently starting and stopping source audio signals of each participating node.

The originating nodes of the exemplary embodiment transmit source audio signals, either directly or indirectly, to a central root mixing node. The central root mixing node mixes the received audio signals to form a composite audio signal for distribution to all participating nodes. The operation of the multi-party voice/data communications system 100 is able to assign individual originating nodes to intermediate mixing nodes, as are described in detail below. Intermediate mixing nodes mix the audio signals they receive, which are able to be either source audio signals sent by originating nodes or lower level composite audio signals that are mixed and sent by lower level intermediate mixing nodes. The intermediate mixing node is then able to send its mixed audio signal to either a higher level intermediate mixing node or to the root mixing node.

The data communications interconnection topology for the originating nodes and the mixing nodes is referred to herein as a "mixing tree." The root mixing node receives audio signals and generates a composite audio signal, which is a mixed audio signal containing all of the source audio signals from each originating node, and transmits the composite audio signal to all of the participating nodes through a distribution tree that is independent of the mixing tree. In the exemplary embodiment of the present invention, the intermediate mixing nodes and the root mixing node are also processing nodes 104 that are able to act as participating and/or originating nodes. The exemplary embodiment of the present invention has no dedicated mixing nodes but rather hosts audio mixing functions on participating processing nodes 104 that are used by users to participate in the Voice Over Internet Protocol (VoIP) conference. Further embodiments, however, are able to incorporate dedicated mixing nodes into their architecture.

Figure 2:
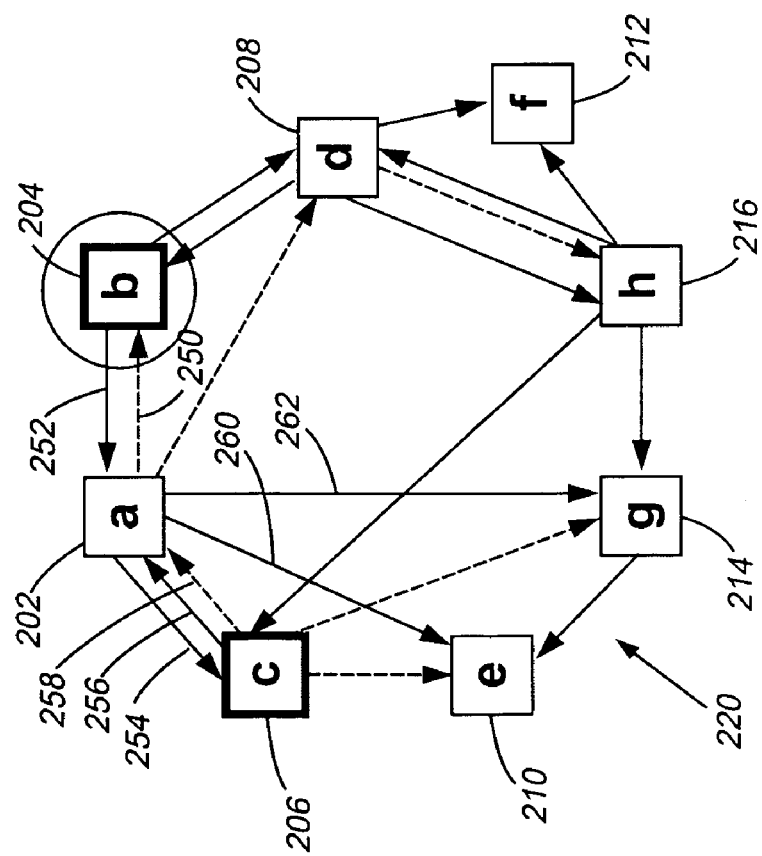
FIG. 2 is an overlay mesh node interconnection diagram for the multi-party voice/data communications system illustrated in FIG. 1, according to an embodiment of the present invention.

FIG. 2 is an overlay mesh node interconnection diagram 200 for the multi-party voice/data communications system 100 illustrated in FIG. 1, according to an embodiment of the present invention. The exemplary multi-party voice/data communications system 100 system uses a network overlay-based approach for better failure resilience. The exemplary multi-party voice/data communications system 100 does not instantly construct a mixing tree and a distribution trees, but rather first connects all of the processing nodes 104 with an overlay mesh that is set up on top of an existing Internet Protocol (IP) network. Audio signal mixing trees and distribution trees are then constructed on top of that overlay mesh. The use of an overlay-based approach allows the multi-party voice/data communications system 100 to (1) reduce tree repairing frequency by leveraging the resilience properties of the overlay mesh, which contains multiple redundant paths between every pair of processing nodes; and (2) leverage reuse of previous overlay multicast processing designs for the processing to build distribution trees in the exemplary embodiments.

In the overly mesh 200 used by the exemplary embodiment of the present invention, each processing node, such as node a 202, node b 204, node c 206, and so forth, is connected with a number of other processing nodes, which are referred to herein as "neighbors," via application-level virtual links called overlay links. The neighbors are selected in the exemplary embodiments based on application specified metrics such as network delay or geographic distance. Each overlay link between a first processing node and a second processing node can be mapped to the IP network path between those two nodes. In this example, node a 202 is connected to node b 204 via overlay link $L_{ab}$ 250 and node b 204 is connected to node a 202 via overlay link $L_{ba}$ 252. Node c 206 is connected to node a 202 via two redundant overlay links, a first overlay link $L_{ca}$ 256 and a second overlay link $L_{ca}$ 258.

The number of neighbors to which a processing node 104 can be connected is called an out-bound degree of the processing node. The out-bound degree of a processing node 104 is limited by the out-bound data communications and processing bandwidth of that processing node. Similarly, the in-bound degree of the processing node 104 is constrained by its in-bound communications and processing bandwidth. Each processing node 104 of the exemplary embodiment sends heartbeat messages to its neighbors to indicate that the processing node 104 sending the heartbeat message is still operating and to also communicate the current stream processing performance (e.g., processing time and throughput) of the processing node 104 sending the heartbeat message. Each processing node 104 of the exemplary embodiment maintains an up-to-date neighbor lists and the information for each neighbor based upon the data received via the heartbeat messages. Each processing node 104 also periodically monitors the network communications delay to its neighbors and the bandwidth of the corresponding overlay links to each of those neighbors by using active probing.

The exemplary multi-party voice/data communications system 100 system performs a distance vector protocol on top of the overlay mesh. Each processing node 104 maintains a determined value of the routing cost (e.g., network communications delay) to every other processing node 104 along each associated network path to that other processing node 104. A distribution tree that is rooted at each processing node 104 is then constructed from the reverse shortest paths in a manner similar to that used by the conventional Distance Vector Multicast Routing Protocol (DVMRP). Each of the processing nodes 104 then communicates to all of the other processing nodes 104 average routing cost data for the distribution tree routed at that processing node 104. The processing nodes then select one processing node 104, as described below, as the root mixing node that is to be the root of the single distribution tree used by the multi-party VoIP session. The routing costs of various embodiments can be selected by different applications to include, for example, network delay, packet loss, or combinations of other parameters. A mixing tree for the exemplary embodiment is then independently and dynamically constructed using an adaptive peer-to-peer mixing algorithm described in detail below.

Adaptive Peer-To-Peer Audio Data Stream Mixing

The exemplary embodiment of the present invention utilizes a fully distributed algorithm for dynamically constructing and adapting an audio data signal mixing tree used by a multi-party Voice Over Internet Protocol (VoIP) service session that allows an arbitrary number of nodes to begin, maintain, and stop providing a source of audio to be mixed for distribution in a peer-to-peer network. The mixing tree constructed by the exemplary embodiment of the present invention adaptively distributes the multi-stream audio mixing workload among different processing nodes.

In the beginning of a multiple party VoIP session, the processing nodes of the exemplary multi-party voice/data communications system 100 perform an election protocol to select the best processing node 104 to be used as a root mixing node. The identified root mixing node of the exemplary embodiment will serve as the root node for both the mixing tree and the distribution tree.

The exemplary multi-party voice/data communications system 100 uses a single distribution tree to send to all participating nodes a mixed audio stream that contains a composite audio signal containing a mixed representation of all source audio signals from each contributing node. This is different than the approach of conventional multicast systems where each processing node that has an active speaker disseminates its audio stream to all participants by sending its source audio stream through its own distribution tree. The use of a single distribution tree provides an optimization opportunity for the system to employ the best multicast tree for the distribution phase. Thus, the operation of the exemplary embodiment selects a rendezvous point, or root mixing node, to be the processing node that is identified to be the root of the best multicast tree to all participating nodes. The rendezvous point serves the root of both the mixing tree and distribution tree in the exemplary embodiments. In the exemplary multi-party voice/data communications system 100, the best multicast tree has a minimum average delay between the root mixing node source and all other participates.

Figure 3:
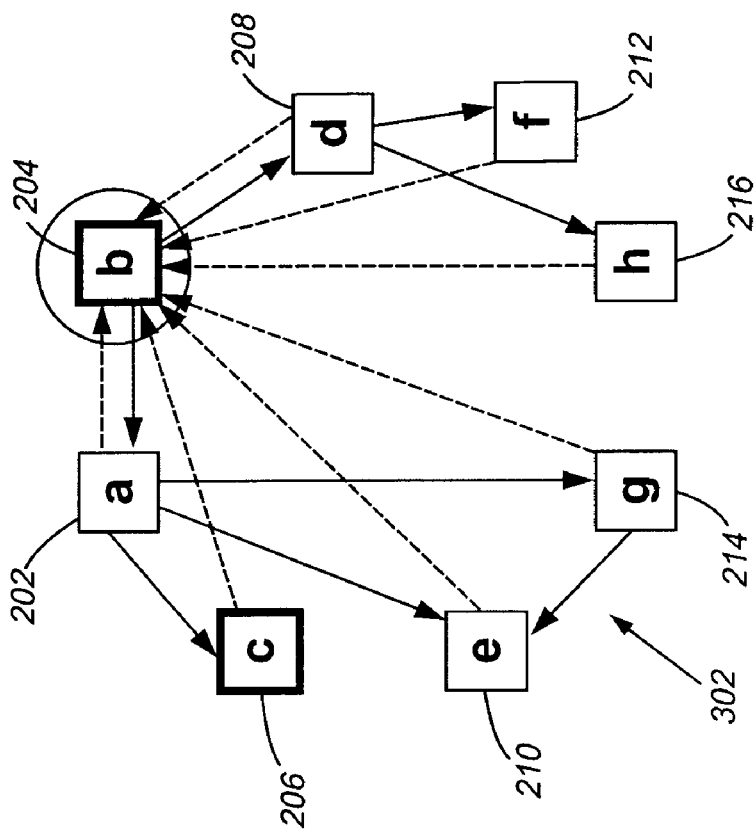
FIG. 3 illustrates a distribution tree and initial mixing tree according to an exemplary embodiment of the present invention.

FIG. 3 illustrates a distribution tree and initial mixing tree 300 according to an exemplary embodiment of the present invention. The exemplary distribution tree and initial mixing tree 300 is a data communications topology 302 for the overlay mesh 200 described above. The data communications topology 302 of the distribution tree and initial mixing tree 300 of the exemplary embodiment have a common root mixing node, or rendezvous point, that is illustrated for this example as node b 204.

In order to select the root mixing node for a particular set of participating nodes, all participating nodes in the exemplary multi-party voice/data communications system 100 concurrently execute a DVMRP algorithm to construct multicast trees that are rooted at themselves and that communicate data from that node to each participating node. Each participating node then calculates the worst-case delay for its own multicast tree and propagates that information to all other participating nodes via the overlay mesh 200. Each participating node of the exemplary embodiment receives the same delay data from the other participating nodes, which results in all participating nodes having identical data concerning propagation delay for the multicast trees from each participating node. All of the participating nodes therefore select the same best processing node as the root mixing node, or rendezvous point, because they all process the same delay data. The participating node whose multicast tree has the minimum average delay is selected as the rendezvous point, which is illustrated as node b 204 for the selected distribution and initial mixing tree 300.

Initially, the mixing tree consists of only the root mixing node instantiated on the rendezvous point, illustrated as node b 204 for the selected distribution and initial mixing tree 300. All participating nodes in the selected distribution and initial mixing tree 300 are connected to the root mixing node 204 as its children for supplying source audio streams for distribution. During runtime, the exemplary multi-party voice/data communications system 100 adaptively grows or shrinks the mixing tree, through the use of a using a fully distributed algorithm described below, by assigning or un-assigning other participating nodes, based on the dynamic audio mixing workload, to be intermediate mixing nodes.

As an initial step in this example, the root mixing node 204 monitors the number of active speakers, i.e., participating nodes that are each providing a respective source audio signal, from within all participating nodes. If the number of current active speakers is larger than the maximum number that the particular root mixing node 204 can handle, a new child mixing node is spawned on another processing node to offload some of the audio mixing workload. The operation of the exemplary embodiments of the present invention implement mixing tree adaptation that allows any mixing node to either, upon determining that the processing node is overloaded, split its processing between itself and another processing node, or merge its audio mixing processing with a sibling mixing node if that processing node and its sibling processing node are under-loaded. The root mixing node is also able to dynamically migrate among different participating node to achieve improved service quality.

Figure 9:
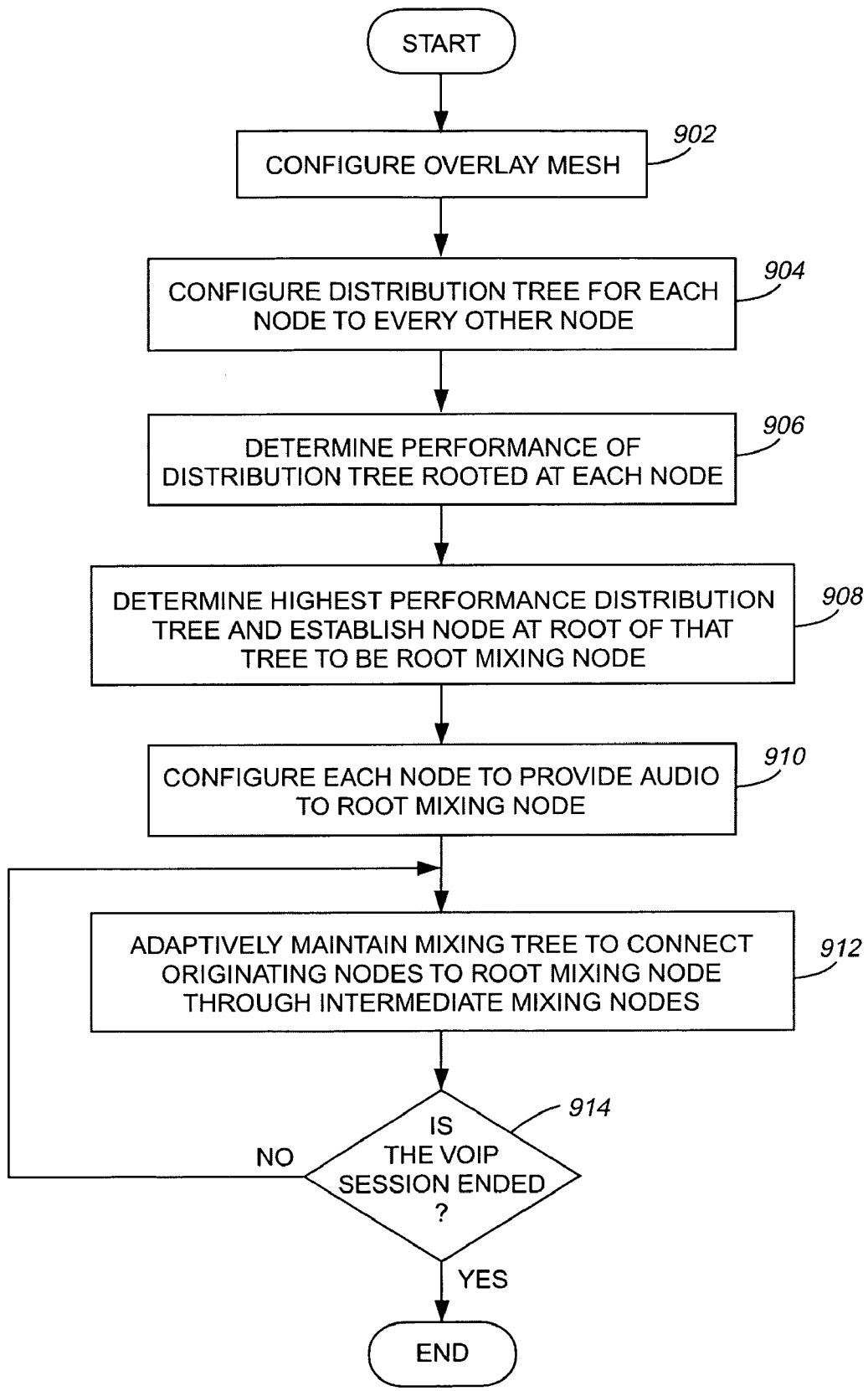
FIG. 9 illustrates a multi-party VoIP session service management flow in accordance with an exemplary embodiment of the present invention.

FIG. 9 illustrates a multi-party VoIP session service management flow 900 in accordance with an exemplary embodiment of the present invention. The multi-party VoIP session service management flow 900 begins by configuring, at step 902, an overlay mesh for all participants in the multi-party network. The processing next proceeds by configuring, at step 904, for each node within the multi-party network a distribution tree for distributing audio stream data from that node to every other node within the multi-party network. The performance characteristics of the distribution tree that is rooted at each node are then determined by processing at the root node of each tree. The distribution tree performance characteristics determined by the exemplary embodiment includes, for example, values of the routing cost that include the network communications delay to every other node along various available network paths to that other node. The processing next determines, at step 908, the highest performance distribution tree among the above distribution trees and establishes the processing node at the root of that distribution tree to be the root mixing node for the multi-party network. The processing of the exemplary embodiment distributes the performance characteristics that are determined by each node for the distribution tree at that node to all of the other nodes in the multi-party network through the overlay mesh interconnections. This results in all nodes having the same performance characteristics information for all nodes in the multi-party network. All nodes in the multi-party network therefore select the same node as having the highest performance.

The multi-party VoIP session service management flow 900 continues by configuring, at step 910, each node to provide audio to the established root mixing node. The processing nodes 104 of the exemplary embodiment independently select the established root mixing node from data shared by all of the nodes in the multi-party network and configure their communications system to transmit audio stream data to the selected root mixing node with the highest performance distribution tree. The processing continues by adaptively maintaining, at step 912, a mixing tree for all originating nodes within the multi-party network, i.e., those nodes providing an audio stream output, to connect the originating nodes to the established root mixing node. This adaptive processing is described in detail below. The processing then determines, at step 914, if the VoIP session has ended. If the VoIP session has not ended, the processing flow continues for the next maintenance period. The VoIP session then ends when all participating nodes have ceased to participate in the multi-party network, the processing then stops.

Figure 4:
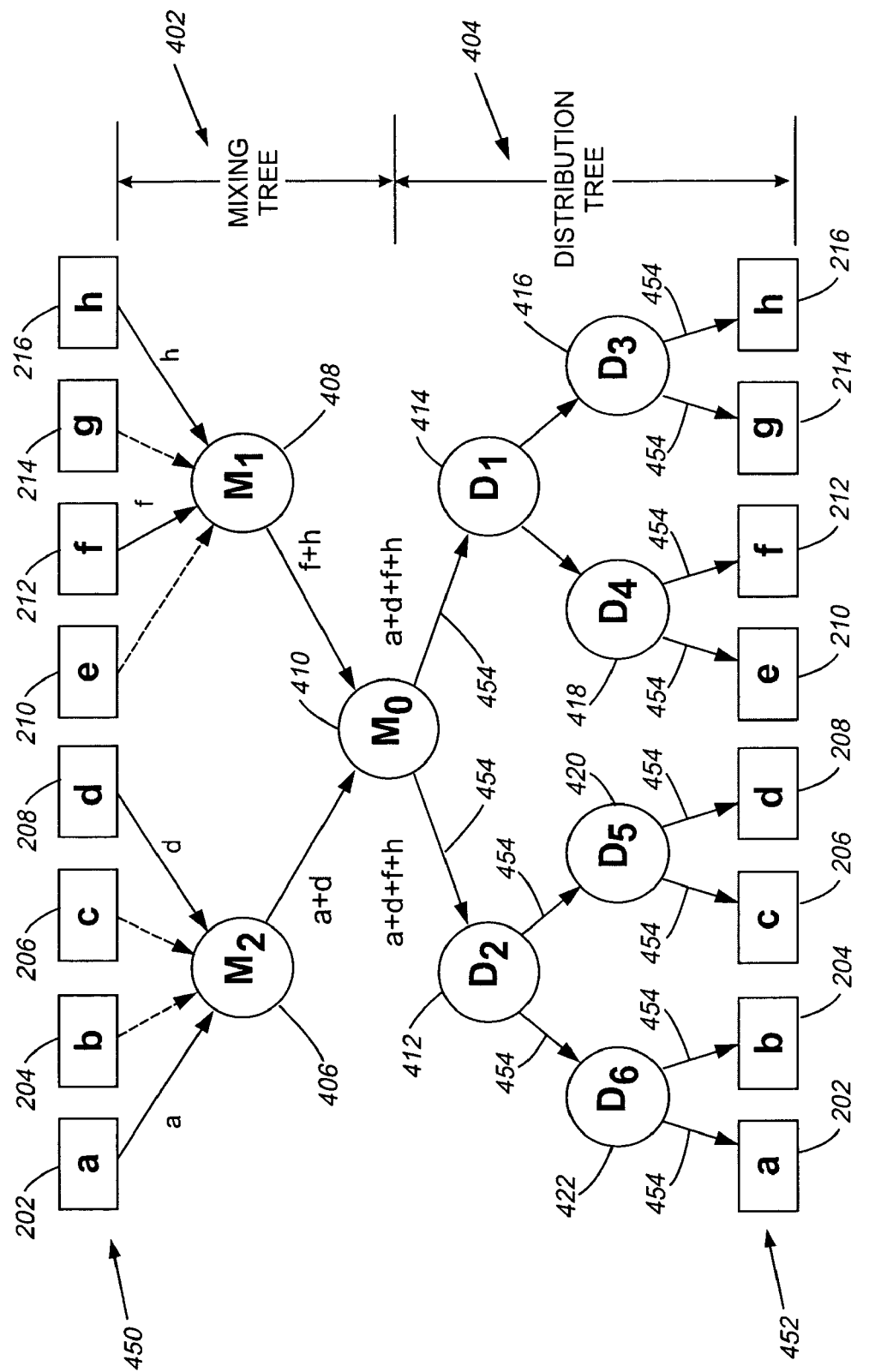
FIG. 4 is an expanded mixing tree and distribution tree node interconnection diagram for the multi-party voice/data communications system illustrated in FIG. 1, according to an embodiment of the present invention.

FIG. 4 is an expanded mixing tree and distribution tree node interconnection diagram 400 for the multi-party voice/data communications system 100 illustrated in FIG. 1, according to an embodiment of the present invention. The expanded mixing tree and distribution tree node interconnection 400 shows eight participating nodes, node a 202 through node h 216. These eight nodes are shown as potential originating nodes 450 at the top of the figure, and are also repeated as receiving nodes 452 at the bottom of the figure. The mixing tree 402 is illustrated schematically as containing two intermediate mixing nodes, intermediate mixing node 1 408 and intermediate mixing node 2 406. The intermediate mixing nodes of this example receive source audio signals from participating nodes that are generating source audio signals, e.g., processing nodes 104 with operators who are speaking and providing audio to be distributed to all participating nodes. Intermediate mixing node 1 408 is shown as being assigned to node e 120, node f 212, node g 214 and node h 216. Intermediate mixing node 2 406 is shown as being assigned to node a 202, node b 204, node c 206 and node 3 208. The intermediate mixing nodes combine, or "mix," the audio signals they receive and produce a composite audio signal that is routed to higher level mixing nodes. In this example, the two intermediate mixing nodes provide their composite outputs to the root mixing node 410. Although the intermediate mixing nodes and root mixing node are illustrated as separate elements for the exemplary expanded mixing tree and distribution tree node interconnection diagram 400, the mixing node functions of the exemplary embodiments are performed by selected processing nodes within the participating nodes, such as each mixing node being assigned to one of node a 202, node b 204, node c 206, node d 208, node e 120, node f 212, node g 214 or node h 216, and no special processing nodes are used for the mixing functions illustrated in FIG. 4.

The expanded mixing tree and distribution tree node interconnection diagram 400 shows that node a 202, node d, 208, node f 212 and node h 216 are currently producing a source audio data. The other nodes, i.e., node b 204, node c 206, node 3 210 and node g 214, are able to produce source audio data but currently are not. This is representative, for example, of a distributed gaming scenario where multiple participants, but not all participants, are concurrently talking and producing audio to be mixed and distributed to all participants.

The root mixing node 410 provides a composite audio stream 454 that is a mixture of the source audio data provided by node a 202, node d 208, node f 212 and node h 216. This composite audio stream 454 is sent from the root mixing node 410 through the distribution tree 404, which consists of intermediate distribution nodes, to all of the participating nodes. Although the intermediate distribution nodes are illustrated as separate elements, the exemplary embodiment utilizes the processing of the participating nodes to perform this distribution processing.

Figure 5:
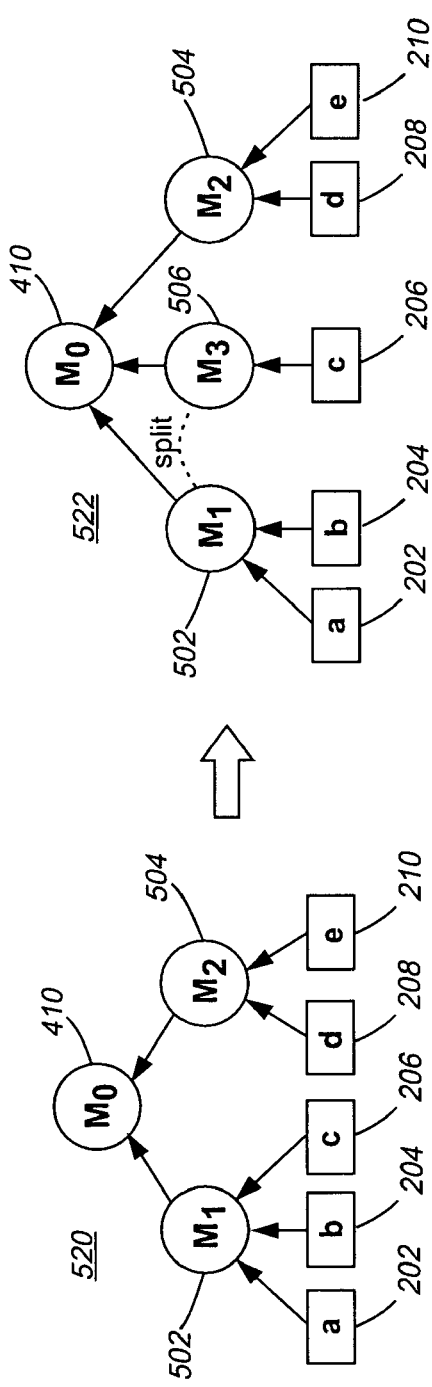
FIG. 5 is an exemplary mixing node splitting interconnection diagram illustrating non-root mixing node splitting according to an embodiment of the present invention.

FIG. 5 is an exemplary mixing node splitting interconnection diagram 500 illustrating non-root mixing node splitting according to an embodiment of the present invention. The exemplary mixing node splitting interconnection diagram 500 illustrates that each mixing node in the mixing tree, including both intermediate mixing nodes Ml 502 and M2 504 as well as root mixing node M0 410, monitors a number of audio streams that concurrently arrive at their input ports. As described above, the mixing nodes of the exemplary embodiment are actually resident on the processing nodes that serve as leaf nodes for the mixing tree. The processing nodes of the exemplary embodiment perform silence suppression and therefore only generate source audio data if the user using that participating node produces sound.

Mixing nodes generate an output audio stream if any of one or more of their input ports receives an input audio data stream. In this example, the mixing nodes have a certain number of input ports and the data that arrives at each input port can be characterized by time series that consists of a sequence of time-stamped numbers that indicates if data arrives at its associated time. The exemplary embodiments of the present inventions maintain a sum that represents the number of input ports that receive data at each discrete time. To enhance and achieve stability, the exemplary embodiments incorporate an exponential smoothing algorithm to only update this sum at periodic intervals.

The length of the period between which the sum that represents the number of input ports that receive data at each discrete time is updated can be determined based upon a trade-off between system stability and responsiveness. Since processing nodes are often resource constrained, they can only process a limited number of audio streams while keeping up with the presented input stream rates without dropping data.

An example of triggering a mixing node split occurs when a mixing node is hosted by a processing node that has a maximum processing limit that allows processing S input streams. The processing node monitors its processing load as well as the load of neighboring nodes, and will trigger mixing node splitting for that node once the number of input streams to this mixing node exceeds that limit or approaches a pre-specified percentage of that limit. If this overloaded mixing node is not the root mixing node mixing node, that node splits itself into two mixing nodes in order to distribute the processing load among more processing nodes.

A pre-split configuration 520 is illustrated showing that three nodes, node a 202, node b 204 and node c 208, are children of mixing node M1 502 and are providing audio data to mixing node M1 502. Mixing node M2 504 is shown has having two children nodes and is receiving audio data from those children nodes identified as node d 208 and node e 210. In the pre-split configuration 520, mixing node M1 502 is determined to be overloaded by the three nodes providing audio data to be mixed. This overload condition can be caused, for example, by the addition of a non-originating node, i.e., a participating node that is not producing an audio stream, becoming a new originating node. This condition is caused, for example, by the new originating node initiation the production of an additional audio stream. A mixing node split process is initiated by mixing node M1 502 to cause a third processing node to become mixing node M3 506. The processing node hosting mixing node M1 502 of the exemplary embodiment identifies and selects its most lightly-loaded neighbor node to become mixing node M3 506. After this split, mixing node M1 502 retains a subset its original children nodes. In the exemplary embodiment, a total number of children nodes that provide audio data to the original mixing node M1 502 are retained so that the node's mixing processing load is less than one half of its capacity. The remaining original children nodes of mixing node M1 502 are then assigned to the third mixing node M3 506. If the workload of the third mixing node M3 506 exceeds the processing limit of the processing node hosting the third mixing node 506, the third mixing node M3 506 itself then initiates a mixing node splitting process to split its inputs with another processing node. It is to be noted that the above described mixing node processes may also trigger the parent mixing nodes of the splitting mixing nodes to split themselves since the number of the children mixing nodes that are providing inputs to the parent mixing node is increased.

Figure 6:
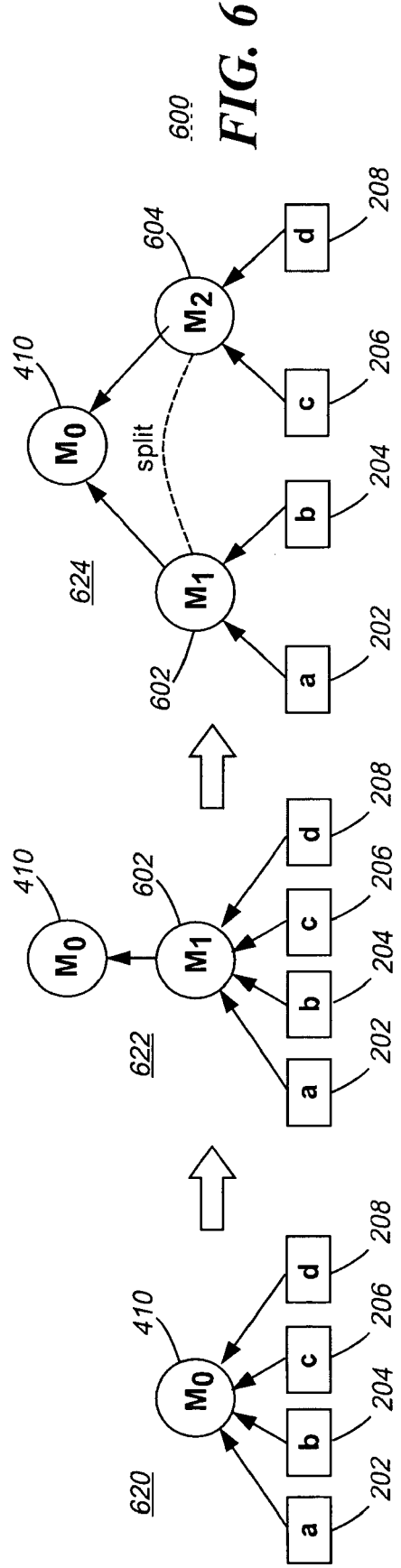
FIG. 6 is an exemplary interconnection diagram illustrating root mixing node splitting according to an embodiment of the present invention.

FIG. 6 is an exemplary interconnection diagram illustrating root mixing node splitting 600 according to an embodiment of the present invention. An overloaded root mixing node scenario 620 processing is triggered when a root mixing node 410 determines that it is becoming overloaded. The root mixing node 410 monitors the processing load on the root mixing node and, upon detecting the overloaded condition, the root mixing node 410 spreads some of its audio mixing processing to one or more newly established intermediate mixing nodes. As is also described above, the newly established mixing node will perform this node splitting process to determine if node splitting is required for that node.

The root mixing node splitting 600 is performed in two steps. A first root mixing node splitting topology 622 illustrates that a processing node 104 acting as a root mixing node identifies and creates a first intermediate mixing node M1 602. The processing configures this first intermediate mixing node as to provide its mixed output of its input audio streams to the root mixing node. All of the children of the root mixing node 410 are then transferred to the first intermediate mixing node M1 602 by being assigned to that processing node. The first intermediate mixing node M1 602 then becomes the only child of root mixing node M0 410. In the exemplary embodiment, the first intermediate mixing node M1 602 is selected as a participating node that has the largest available stream processing capacity. The addition of the first intermediate mixing node M1 602 increases the height of the mixing tree by one level. If the processing capacity of the processing node 104 selected to host the first intermediate mixing node M1 602 fails to have sufficient processing capacity to mix all of its input signals, the first intermediate mixing node M1 602 performs the intermediate mixing node splitting processing 500 described above to create a second intermediate mixing node 604, as is illustrated in the second root mixing node splitting topology 624. If the first intermediate mixing node M1 602 is able to perform the mixing without requiring splitting, the first intermediate mixing node M1 602 is able to become the new root mixing node.

In the second root mixing node splitting topology 624, the input audio streams are distributed among the spawned mixing nodes that were created by the above splitting processing in order to minimize the average workload for all input audio streams. In order to determine which input audio streams to assign to a particular mixing node, the processing of the exemplary embodiment monitors arrival times of data packets from the participating nodes, and calculates a correlation coefficient between each pair of data packet arrival times. This correlation coefficient indicates the probability of concurrent data arrivals on the input ports, and their connected audio data sources, from the sources associated with the correlation coefficient. The least correlated input streams are then allocated to the same mixing node in order to minimize the average aggregate workload at each mixing node.

Figure 10:
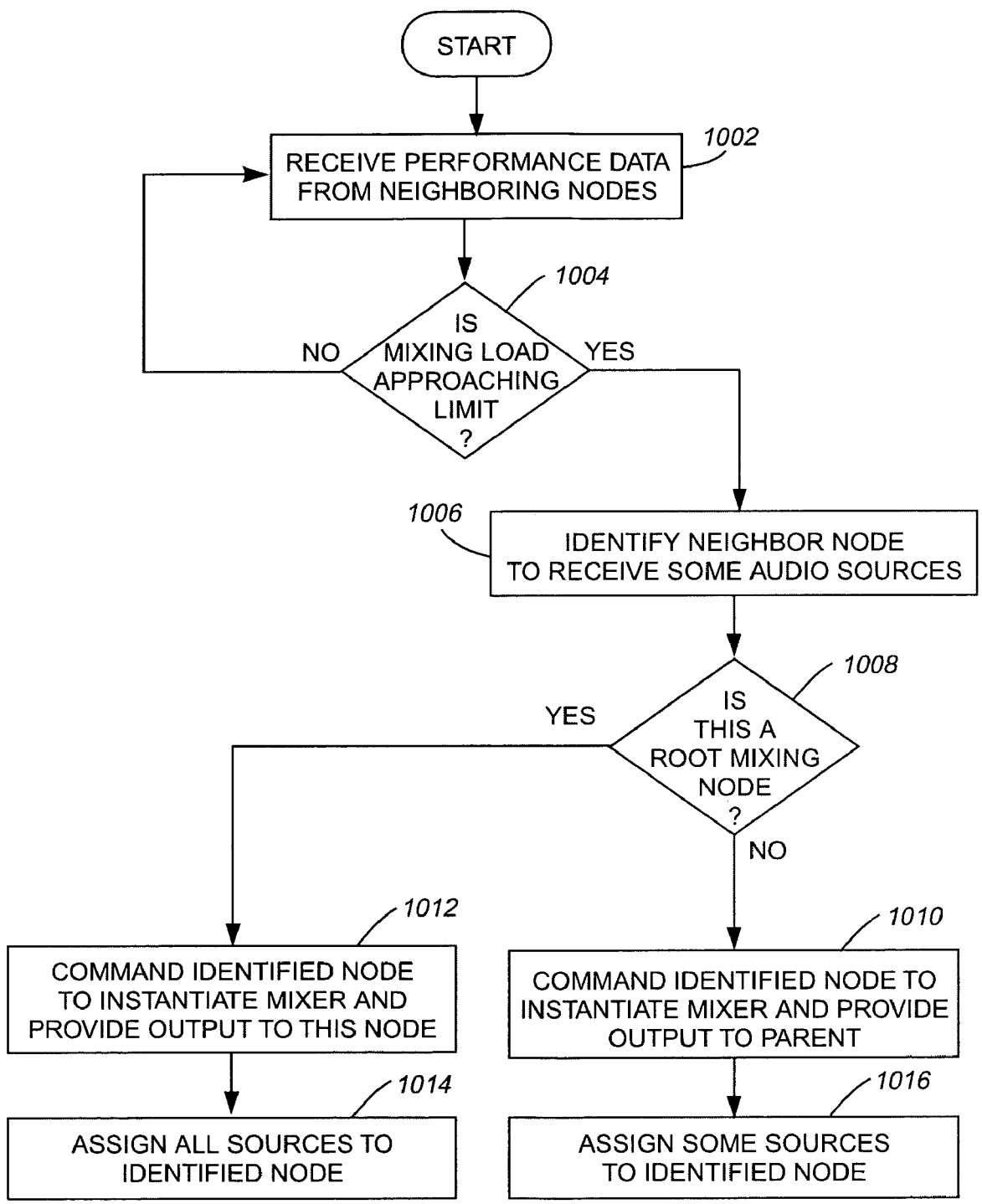
FIG. 10 illustrates a mixing node splitting process in accordance with an exemplary embodiment of the present invention.

FIG. 10 illustrates a mixing node splitting process 1000 in accordance with an exemplary embodiment of the present invention. The mixing node splitting process 1000 begins by receiving, at step 1002, performance data from neighboring nodes. The exemplary embodiment of the present invention includes processing nodes 104 that continually collect the performance data for itself and distributes that performance data to all other participating nodes, which includes the mixing nodes of the exemplary embodiment. This performance data includes, for example, the total unused processing capacity for the participating node, the current mixing workload for the processing node, and the network communications performance from that participating node to other participating nodes.

The mixing node splitting process 1000 continues by determining, at step 1004, if the mixing load for this mixing node is approaching a limit. This limit is configurable in the exemplary embodiment to be either the maximum capacity of the processing node or some percentage of the processing node's maximum capacity. If the mixing load of this processing node is not approaching the pre-set limit, the processing returns to receiving, at step 1002, performance data form neighboring nodes.

If the mixing load of this processing node is approaching the pre-set limit, the mixing node splitting process 1000 continues by identifying, at step 1006, the neighbor node that is to receive some audio sources. This neighbor node is identified based upon, for example the processing capacity available on that node. The processing next determines, at step 1008, if the mixing node performing this processing (and which is shedding some audio sources to another node) is the root mixing node for the mixing tree.

If the mixing node performing this processing is not the root mixing node, the processing continues by commanding, at step 1010, the identified neighbor node to instantiate a mixer process and to provide its mixed audio output to the same parent mixing node as that of the mixing node performing this processing. The processing then continues by assigning, at step 1016, some audio sources, which are able to be either originating nodes or other mixing nodes, to provide their audio output data to the identified neighbor node. The processing then returns to receiving, at step 1002, performance data from neighboring nodes. It is to be noted that that the neighbor node that becomes the newly established mixing node will perform this node splitting process to determine if node splitting is required for that node.

If the mixing node performing this processing is determined, at step 1008, to be the root mixing node, the processing continues by commanding, at step 1012, the identified neighbor node to receive the audio sources to instantiate a mixer process and to provide its mixed audio output to this node. The processing next assigns, at step 1014, all audio sources, which are either originating nodes or other mixing nodes, of the root mixing node performing this processing to the newly established mixing node, as is described above. The processing then returns to receiving, at step 1002, performance data from neighboring nodes. It is to be noted that that the neighbor node that becomes the newly established mixing node will perform this node splitting process and is likely to determine that further node splitting is required since all audio sources for the to determine if node splitting is required for that node.

Figure 7:
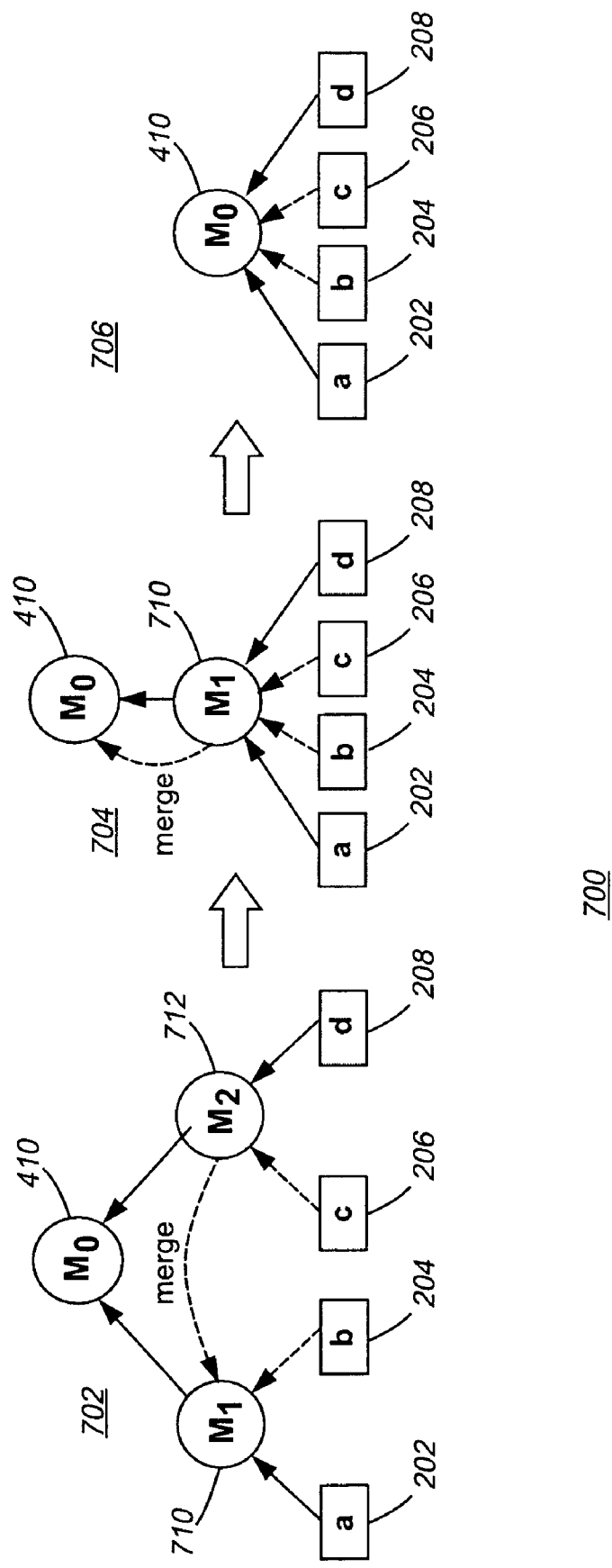
FIG. 7 illustrates a mixing node merging process as performed by an exemplary embodiment of the present invention.

FIG. 7 illustrates a mixing node merging process 700 as performed by an exemplary embodiment of the present invention. The mixing node merging process 700 is able to shrink the mixing tree to avoid excessive audio mixing overhead, such as data delay and packet loss, by minimizing the number of mixing nodes traversed by the source audio streams. In this diagram, the participating nodes that are actively producing audio stream data and sending that data to a mixing node are indicated by a solid arrow from that participating node to the mixing node. A dashed arrow indicates that the participating node is assigned to a mixing node, but is not actively producing and sending an audio stream. In a manner similar to that discussed above for the mixing node splitting process, each mixing node monitors the number of audio streams concurrently arrived at its input ports. If the total workload for a particular mixing node is significantly less than that mixing node's processing capacity, e.g., the exemplary embodiment has a pre-determined threshold that corresponds to total current workload being less than half of the node's capacity, that mixing node attempts to merge mixing functions with a sibling mixing node in the mixing tree. The exemplary embodiments of the present invention organize the mixing tree children list in a circular queue in order to avoid redundant merging (e.g., mixing node Ml attempting to merge with mixing node M2, and then mixing node M2 attempting to merge with mixing node Ml).

If the aggregate workload of a two adjacent mixing nodes is below the pre-determined threshold, i.e., the combined workload of mixing node M1 710 and mixing node M2 712 is within the capacity of one or both of those nodes alone, the mixing operations of those mixing nodes are merged into one mixing node, as is illustrated for the mixing node merging diagram 702. The mixing node with the higher capacity, mixing node M1 710 in this example, is generally chosen to be the new, merged mixing node. The other mixing node, mixing node M2 712, was assigned to node c 206 and node d 208. The children of that other mixing node, mixing node M2 712 in this example, are assigned to the merged mixing node, mixing node M1 710 in this example, as is illustrated for the merged mixing node diagram 704. Note that the above process may trigger the parent of the new merged mixing node perform mixing node merging since the input stream number of the parent mixing node decreases as the other mixing node is removed. If the mixing node merging results in the merged mixing node becoming the only child of its parent mixing node, the merged mixing node and its parent mixing node can then also be merged, as is illustrated in the parent mixing node merging diagram 706, to reduce the height of the mixing tree. The situation occurs when the all of the children mixing nodes, such as mixing node M1 710 and mixing node M2 712, of a parent mixing node M0 410 merge with each other into one mixing node. In this case, the participating nodes assigned to the children mixing nodes, such as mixing node M1 710 and mixing node M2 712, are assigned to the parent mixing node M0 410. Some embodiments of the present invention avoid system thrashing between mixing node splitting and mixing node merging by requiring that mixing node merging cannot be triggered within a certain time threshold if one of the mixing nodes has just been split from the other mixing node.

Figure 11:
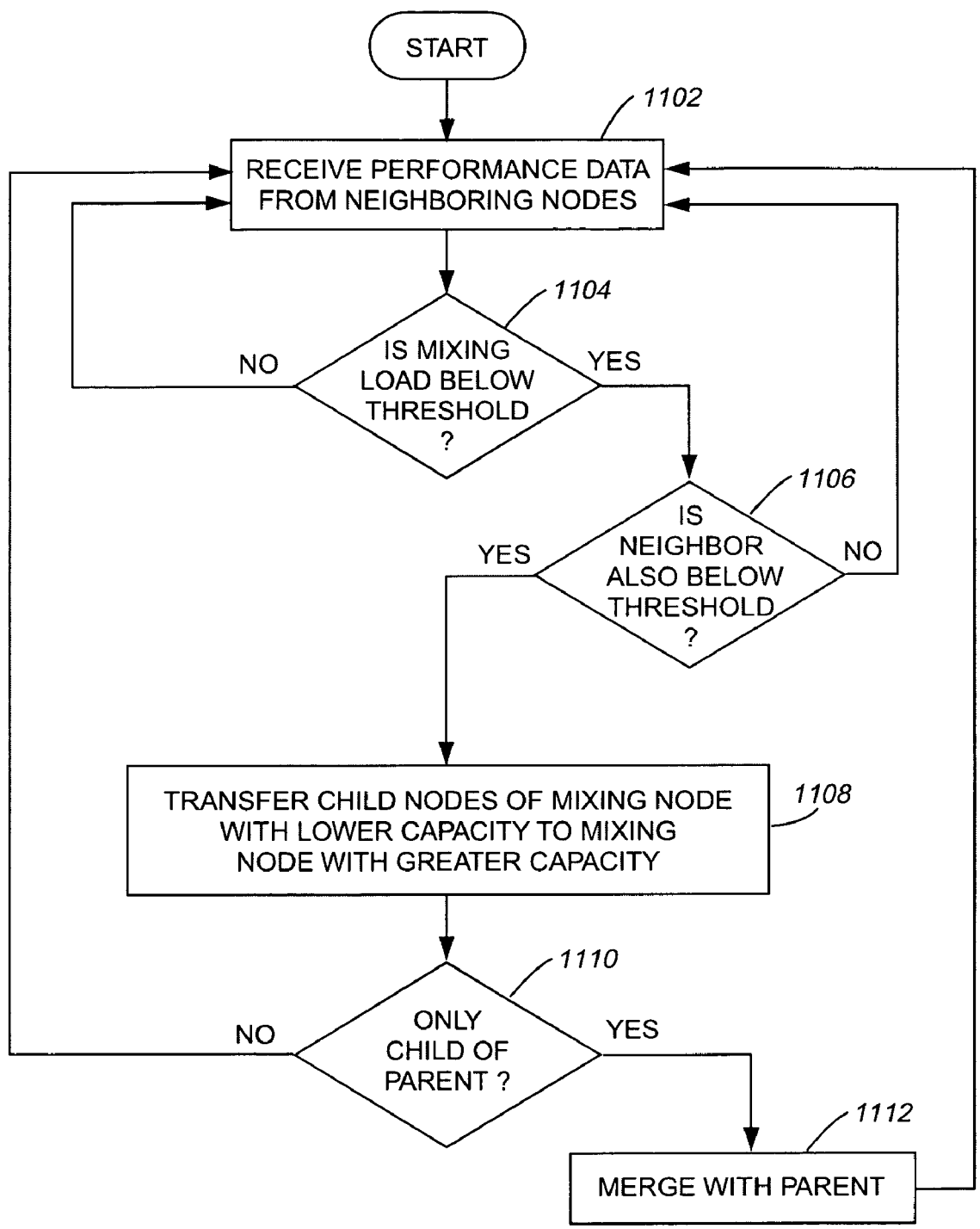
FIG. 11 illustrates a mixing node merging process according to an exemplary embodiment of the present invention.

FIG. 11 illustrates a mixing node merging process 1100 according to an exemplary embodiment of the present invention. The mixing node merging process 1100 begins by receiving, at step 1102, performance data from neighboring nodes. As described above, the exemplary embodiment of the present invention includes processing nodes 104 that continually collect the performance data for itself and distributes that performance data to all other participating nodes, which includes the mixing nodes of the exemplary embodiment. This performance data includes, for example, the total unused processing capacity for the participating node, the current mixing workload for the processing node, and the network communications performance from that participating node to other participating nodes.

The mixing node merging process 1100 continues by determining, at step 1104, if the mixing load for this mixing node below a pre-determined threshold. This pre-determined threshold is configurable in the exemplary embodiment to be equal to one half of the maximum capacity of the processing node. This pre-determined threshold is able to be set to any desired percentage of the processing node's maximum capacity. If the mixing load of this processing node is not below the pre-determined threshold, the processing returns to receiving, at step 1102, performance data form neighboring nodes.

If the mixing load of this processing node is below the pre-determined limit, the mixing node merging process 1100 continues by determining, at step 1106, if its neighbor node is also below the same pre-determined threshold. This neighbor node is defined according to a circular queue to avoid redundant merging, as described above. If the neighbor node is not determined to be below the pre-determined threshold, the processing returns to receiving, at step 1102, performance data form neighboring nodes.

If the processing determined that the neighbor node is also below the pre-defined threshold, the processing continues by transferring, at step 1108, the children nodes of the mixing node with lower capacity to the mixing node with the greater capacity. Once this transfer is performed, the mixing node from which the children nodes were transferred will no longer be required to maintain a mixer process, and is able to conserve resources by terminating that process. The processing next determines, at step 1110, if this node is the only child node of its parent. If this node is not the only child of its parent, the processing returns to receiving, at step 1102, performance data form neighboring nodes. If this node is the only child of its parent, the processing merges, at step 1112, with the parent mixing node by reiterating the above described steps. The processing then returns to receiving, at step 1102, performance data form neighboring nodes.

Mixing Node Migration

The exemplary embodiments of the present invention perform dynamic mixing node migration to continuously optimize the audio mixing process. A mixing node can be migrated to a neighbor processing node of the mixing node if the neighbor processing node is better in terms of (a) a larger stream processing capacity because of more abundant CPU, memory and network bandwidth resources; (b) a better network connection (i.e., less delay or packet loss) from the children of the current mixing node, and then from current mixing node to the parent of the current mixing node; or (c) higher availability of the neighbor processing node. Each of these criteria can lead to different processing node comparison results. Thus, the exemplary embodiments of the present invention allow the upper-level application to prioritize these different criteria for customized decision-making.

As an example of a migration of a mixing node, assume that the above described criteria (a), (b), and (c) are listed in decreasing priority order. Each mixing node periodically probes its neighbor in the overlay mesh to determine whether migration of its mixing node functions should be triggered. In making this determination, the mixing node sends a message to each of its neighbors that specifies the address of its parent mixing node and the address of the children nodes that are providing audio input to this mixing node. This mixing node then receives from each neighboring processing node, in response to sending the above information, a set of information including (1) that neighbor's current stream processing capacity, (2) that neighbor's average delay/packet loss from each of the specified children nodes and to the parent mixing node, and (3) a failure probability for that neighbor node. This mixing node initially selects the qualified neighbor processing nodes whose processing capacity can satisfy this mixing node's current workload. If qualified neighbor processing nodes exist, this processing node further selects the best neighbor processing node that has (1) minimum worst-case delay/packet loss to the relevant nodes, and (2) the lowest failure/departure probability. If the identified best neighbor processing node is significantly better than the current mixing node with regards to the above specified criteria, the current mixing node migrates is migrated to the selected neighbor processing node. In order to improve system stability, mixing node migration is triggered in the exemplary embodiment only if the neighbor processing node is better than the current mixing node processing node by a certain threshold value.

To achieve smooth mixing node migration, the exemplary embodiments first create a new mixing node on the selected neighbor processing node and connect the new mixing node to the parent of the current mixing node. The children of the current mixing node are then assigned to the new mixing node. In the meantime, the system still uses the current mixing node to serve the current multi-party VoIP session. When the new mixing node finishes the setup, the children of the current mixing node are notified to send audio streams to the new mixing node and the current mixing node then halts its audio signal mixing processes. Since the new mixing node is able to be instantiated on a more powerful processing node than the old processing node, the new mixing node is able to then trigger a mixing node merging process with remaining mixing nodes. Hence, the mixing node migration can not only improve the performance of the current mixing tree but also help to consolidate the mixing tree so as to reduce intermediate mixing nodes during the stream mixing process.

System Resilience

The exemplary embodiments of the present invention advantageously provide a light-weight replication-based failure recovery mechanism to tolerate fail-stop failures of networks and processing nodes. In order to improve overall system resilience and reliability, each active mixing node in the mixing tree 402 maintains one or more backup replicas on other different processing nodes. Active mixing nodes are referred to in the following discussion as a primary mixing node. In contrast to a reactive approach that dynamically finds a replacement for the primary upon its failure, the replication-based approach of the exemplary embodiment is proactive by maintaining a number of backup mixing nodes in advance. The use of this proactive approach provides two benefits. A first benefit is that Peer-to-Peer environments generally provide sufficient redundant resources for hosting the backup replicas and the proactive approach takes advantage of these available redundant resources. A second benefit is that the proactive approach obviates construction of a new mixing tree 402 "on-the-fly" should any of the pre-defined backup mixing nodes be usable. The exemplary embodiment of the present invention thus achieves fast failure recovery for time sensitive multi-party VoIP services.

As an example of the operation of the proactive approach used by the exemplary embodiment, assume that the mixing nodes are configured to maintain a specified number of back-up replicas. As described above, each mixing node periodically probes its neighbor processing nodes to determine if one of neighbor processing nodes is better qualified, based upon defined criteria, for hosting of the mixing node functions. In addition to determining if a neighbor processing node is better qualified to perform the mixing node functions, the primary mixing node is able to identify the specified number of qualified processing nodes that are best suited to host replica mixing nodes. If there are fewer than the specified number of qualified processing nodes, the primary mixing node probes the neighbor nodes of its neighbors until the specified number replica mixing nodes are found and instantiated. During operations, each primary mixing node periodically probes its replica mixing nodes to determine if they are still operating and to update the states of all replica mixing nodes. If one of replica mixing nodes becomes unavailable, the primary mixing node performs processing to identify another qualified processing node in its nearby neighborhood to perform the replica mixing node functions of the now unavailable replica mixing node. When a primary mixing node is migrated to a new processing node, the replica mixing nodes are also migrated to the neighbors of the new processing node to assure that backup mixing nodes are still close to the primary for localized replica mixing node maintenance.

The selected number of replica mixing nodes that are selected to be maintained for each primary mixing node in a particular embodiment or configuration represents a trade-off between failure resilience and replication overhead. If each primary mixing node maintains k replica mixing nodes in operation at all the times, the primary mixing node can survive k-1 concurrent replica mixing node failures.

Note that the roles of different mixing nodes are non-uniform to the failure-resilience of a particular mixing tree. In a case where mixing nodes are arranged in a tree so that a particular mixing node provides a mixing of audio stream outputs to the root mixing node through multiple higher level mixing nodes, a number of replicas, which correspond to a number of additional backup mixing nodes, maintained for each mixing node is able to be based upon the number of higher level mixing nodes through which the particular mixing node communicates the mixing of audio stream outputs to reach the root mixing node.

The higher level mixing nodes in a mixing tree 402 are generally more important than the lower level mixing nodes because they are responsible for aggregating the output streams of lower level mixing nodes. Thus, some embodiments of the present invention incorporate a differentiated mixing node replication scheme that maintains more replica mixing nodes that are at higher levels within in the mixing tree 402. Maintaining more replica mixing nodes for higher level primary mixing nodes provides a benefit of maximizing the overall failure resilience of multi-party VoIP services while limiting mixing node replication overhead. As an example, if the root mixing node 410 fails, all multi-party VoIP session participants are cut off from each other. However, if a lower level mixing node, such as intermediate mixing node 1 409 fails, all participants can still hear the voices of the users of node a 202, node b 204, node c 206, and node d 208. In that example embodiment, a design choice may maintain two replicas for root mixing node 410 but only maintain one replica mixing node for intermediate mixing node 1 408 and intermediate mixing node 2 406.

Failure Detection

Figure 8:
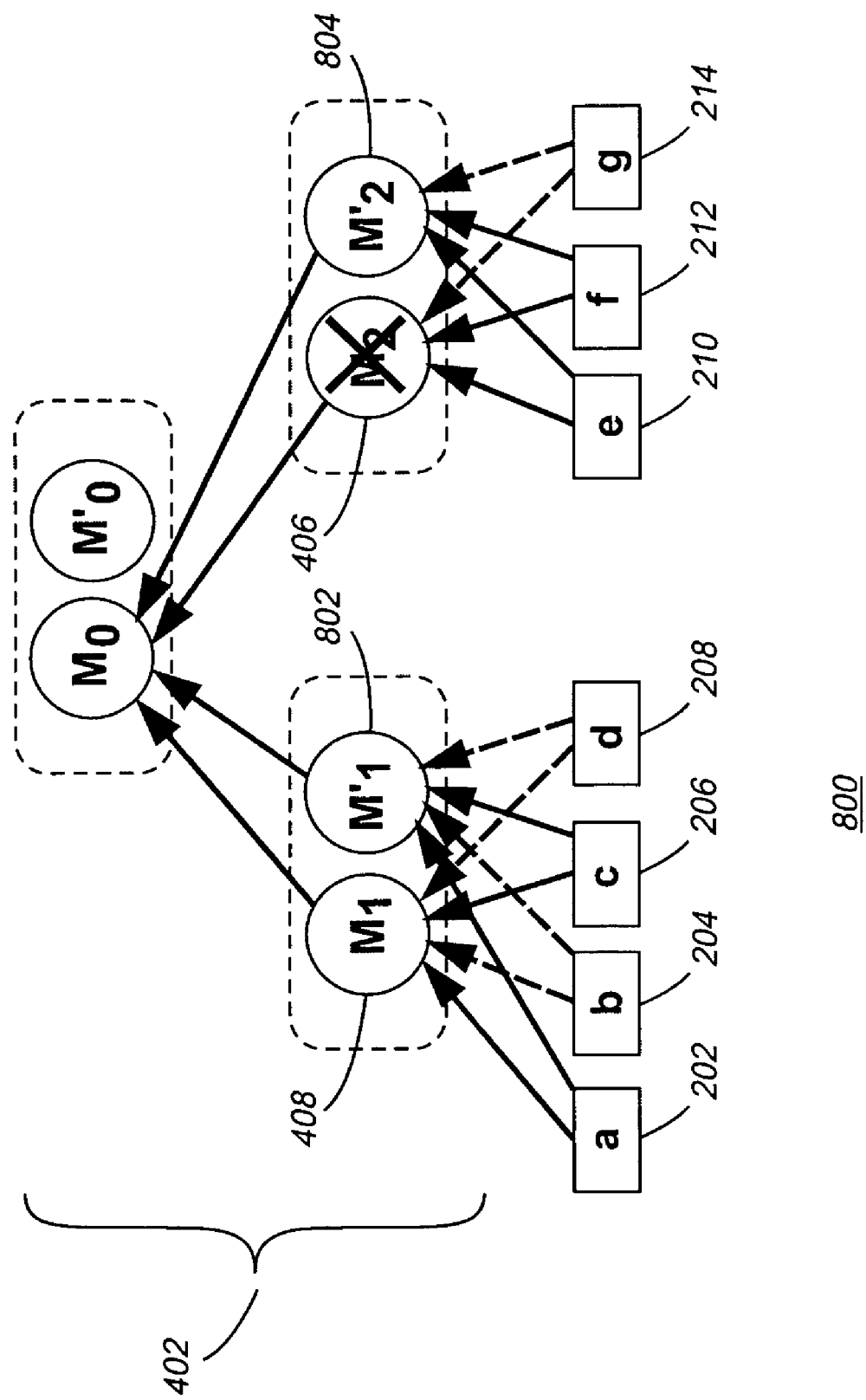
FIG. 8 illustrates failure detection and response processing as performed by an exemplary embodiment of the present invention.

FIG. 8 illustrates failure detection and response processing 800 as performed by an exemplary embodiment of the present invention. The failure of the mixing tree 402 can be caused by either network communications failures between processing nodes or failures of the processing nodes themselves. The exemplary failure detection and response processing 800 illustrates two mixing tree failures. In this diagram, the participating nodes that are actively producing audio stream data and sending that data to a mixing node are indicated by a solid arrow from that participating node to the mixing node. A dashed arrow indicates that the participating node is assigned to a mixing node, but is not actively producing and sending an audio stream. A first illustrated failure is a failure of the communications link between a participant node, node a 202, and the intermediate mixing node 1 408. A second illustrated failure is a failure of the node hosting the intermediate mixing node 2 408. The exemplary embodiment of the present invention recovers from the failures by switching to the backup replica mixing nodes of both intermediate mixing node 1 408 and intermediate mixing node 2 406. In this response, replica mixing node 1 802 replaces intermediate mixing node 1 408 and replica mixing node 2 804 replaces intermediate mixing node 2 406.

The operation of some of the exemplary embodiments do not distinguish between so called "graceful failures" (e.g., quitting with notification) and so called "fail-stop failures" (e.g., a node that crashes or leaves operation without notification). Some embodiments are configured to handle graceful failures more efficiently. For example, a quitting processing node is able to be configured to continue operation until the operation of the other processing nodes finishes switching mixing functions to one of its replica mixing nodes.

Failure recovery is able to be triggered by a replica mixing node that stops receiving a heartbeat message from the primary mixing node with which they are associated. When the replica mixing node stops receiving this heartbeat message, the replica mixing node is able to assume that the primary mixing node has failed. The replica mixing node is then able to then execute an election algorithm to determine which replica mixing node should take over based on pre-defined election criteria (e.g., a smallest peer identifier). The elected replica mixing node then contacts the parent and the children of the failed primary mixing node to command parent and the children of the failed mixing node to drop connections to the failed primary mixing node and connect to the new primary mixing node.

Churn Management

In contrast to conventional client-server systems, Peer-to-Peer VoIP systems are able to exhibit a high rate of continuous node arrivals and departures, which is referred to as "churn." The processing nodes of the exemplary embodiments of the present invention reacts to churn based upon the role of the particular processing node. The various roles that determine a processing node's reaction to churn include (1) a participating node that produces and receives audio streams; (2) an overlay router that provides application-level forwarding in the overlay mesh; (3) a mixing node that provides audio mixing service, (4) a distributing node that distributes audio streams to multiple receivers; and (5) a backup mixing node that hosts mixing node replicas.

Processing node joins. When a new processing node wants to join an existing multiparty VoIP session, that new processing node is first incorporated into the Peer-to-Peer overlay mesh by a conventional out-of-band bootstrap mechanism. The new processing node selects a few processing nodes that are provided by the bootstrap service as neighbors and also transmits a request to a few other processing nodes to add the new processing node as one of their neighbors. After the new processing node successfully joins the overlay mesh, it becomes an overlay router that can forward packets for its neighbors. The new processing node then broadcasts a message to other processing nodes via the overlay mesh requesting to join the multi-party VoIP session. The processing node can acquire a session identifier for the multi-party VoIP session from the bootstrap service. When a processing node that is already in the session receives the requesting message, it replies to the message with a response containing the address of the mixing node to which it is connected. The new processing node then connects to the mixing node indicated in the response according to the first reply it receives and ignores other later replies. Thus, the new processing node is successfully added into the mixing tree by becoming a child of that specified mixing node. The overlay multicast algorithm can connect the new processing node into the distribution tree. While the new processing node stays in the system, the processing node can be selected to play the role of mixing node, distributor or backup.

Processing node departures. When a departing processing node leaves the network without pre-notice (e.g., as a result of a crash or disconnection), the exemplary embodiments react by repairing the overlay mesh and updating membership lists on the other live processing nodes. The neighbors of the departing processing node can detect its departure by detecting that they have stop receiving the heartbeat messages from the departing processing node for an extended period. The mesh is updated by deleting the departing processing node from the neighbor lists of all other live processing nodes. The mesh can become partitioned because of the departure of the departing processing node. The partitioned mesh can be repaired by adding more overlay links at partitioned processing nodes. If the departing processing node also hosts a primary mixing node (i.e., an active and not backup mixing node), the departure triggers a dynamic failure recovery process to repair the mixing tree by substituting a replica of the mixing node hosted by the departing node. If the departing processing node only acts as a backup mixing node for a primary mixing node, the departure causes its associated primary mixing node to create a new backup replica.

Exemplary Information Processing System

Figure 12:
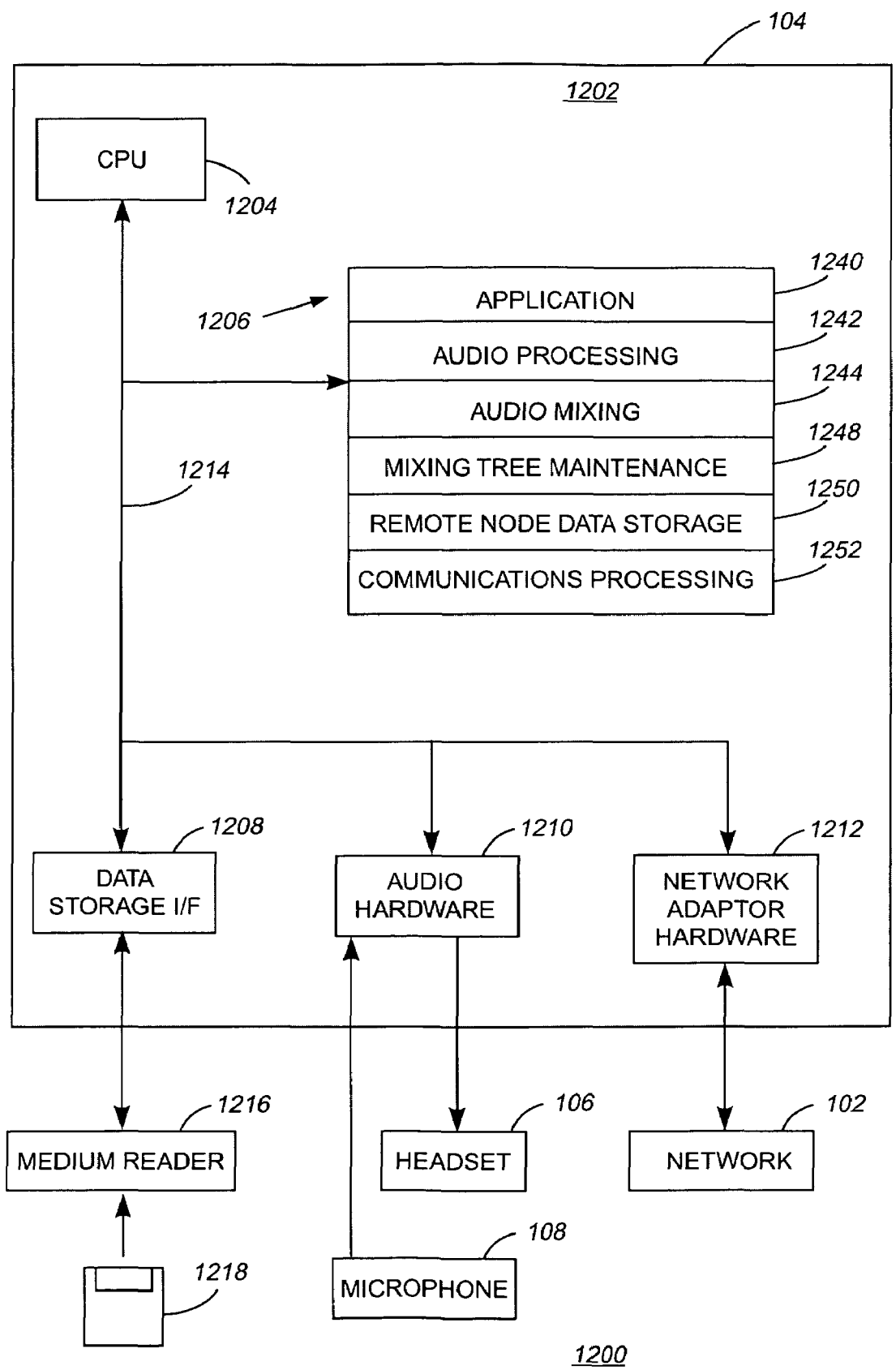
FIG. 12 is a block diagram illustrating a more detailed view of a processing node according to an embodiment of the present invention.

FIG. 12 is a block diagram illustrating a more detailed view of a processing node 104 according to an embodiment of the present invention. The processing node 104 is based upon a suitably configured processing system adapted to implement the exemplary embodiment of the present invention. Any suitably configured processing system is similarly able to be used as a processing node 104 by embodiments of the present invention, for example, a personal computer, computing workstation, game console, or the like. The processing node 104 includes a computer 1202. The computer 1202 has a processor 1204 that is connected to a main memory 1206, data storage interface 1208, audio hardware 1210, and network adapter hardware 1212. A system bus 1214 interconnects these system components.

The data storage interface 1208 is used to connect data storage devices, such as data medium reader 1216, to the processing node 104 information processing system. One specific type of data storage device is a computer readable medium such as a floppy disk drive, DVD/CD reader, memory cards, or the like, which are able to be used to store data to and read data from compatible media 1218, such as a floppy disk or memory card. Another type of data storage device is a data storage device configured to support, for example, NTFS type file system operations.

The main memory 1240 comprises an application 1240 that is executed by the processing node 104. Application 1240 is able to be, for example, a multi-player game that supports multi-player operations with other users on other processing nodes 104 that are connected through network 102. Such games are able to support multi-player audio support where any number of users is able to speak and all other players hear the composite speech. Main memory 1240 further includes an audio processing program 1242 that is used to encode and decode audio signals obtained by or provided to the audio hardware 1210 and connected devices such as headset 106 and microphone 108.

The main memory 1240 further includes an audio mixing program 1244 that controls the performance of the mixing node operations described above. The main memory 1240 also includes a mixing tree maintenance program 1248 that controls the establishment and maintenance of the mixing tree 402 by splitting and merging mixing nodes, as described above. The main memory 1240 also includes a remote node data storage 1250 to store data about other participating processing nodes 104 as received through, for example, heartbeat messages. The remote node data storage 1250 stores, for example, the processing load and data communications connectivity observed by each of the other processing nodes 104. The main memory 1240 further includes a communications processing program 1252 that performs other communications processing such as, for example, establishing a mesh overlay, determining communications statistics and data such as throughput and delays to each node in the mesh overlay, and establishing a distribution tree from this processing node 104 to every other processing node 104 in the network to evaluate the suitability of using this node as a root mixer. The communications processing program 1252 further sends and receives periodic heartbeat messages to and from neighbor nodes.

Although illustrated as concurrently resident in the main memory 1206, it is clear that respective components of the main memory 1206 are not required to be completely resident in the main memory 1206 at all times or even at the same time. In one embodiment, the processing node 104 utilizes conventional virtual addressing mechanisms to allow programs to behave as if they have access to a large, single storage entity, referred to herein as a computer system memory, instead of access to multiple, smaller storage entities such as the main memory 1206 and data storage device 216. Note that the term "computer system memory" is used herein to generically refer to the entire virtual memory of the processing node 104.

Although only one CPU 204 is illustrated for computer 1202, computer systems with multiple CPUs can be used equally effectively. Embodiments of the present invention further incorporate interfaces that each includes separate, fully programmed microprocessors that are used to off-load processing from the CPU 1204. Audio hardware 1210 is used to connect to a headset 106 and microphone 108, an other audio input and/or output devices (not shown) to allow a user to input audio information to be broadcast to other processing nodes 104 and to physically reproduce received composite audio signals for a user to hear through, for example, headset 106.

An operating system (not shown) included in the main memory is a suitable multitasking operating system such as the Linux, UNIX, Windows XP, and Windows Server 2003 operating system. Embodiments of the present invention are able to use any other suitable operating system. Some embodiments of the present invention utilize architectures, such as an object oriented framework mechanism, that allows instructions of the components of operating system (not shown) to be executed on any processor located within the processing node 104. The network adapter hardware 212 is used to provide an interface to the network 110. Embodiments of the present invention are able to be adapted to work with any data communications connections including present day analog and/or digital techniques or via a future networking mechanism.

Although the exemplary embodiments of the present invention are described in the context of a fully functional computer system, those skilled in the art will appreciate that embodiments are capable of being distributed as a program product via floppy disk, e.g. floppy disk 218, CD ROM, or other form of recordable media, or via any type of electronic transmission mechanism.

Exemplary Teleconference User Interface

FIG. 4 illustrates an exemplary user interface 400 that provides a user with information and options associated with a teleconference. In one embodiment, the user interface 400 resides in a window 402 that is typical of a graphical user interface. Clickable buttons 404 are provided that allow the user to resize or close the user interface 400. Menu buttons 406 are also included and allow a user to perform various actions as defined within the menus. A description 408 of the teleconference is provided for easily identifying the purpose of the teleconference. A section 410 provides the date of the teleconference. Another section 412 provides the scheduled time of the teleconference. A countdown 414 is also provided to notify the user of the time remaining until the teleconference is scheduled to start. An icon 416 also displays the remaining time. The teleconference call-in information 418 is also displayed to the user.

The user interface 400 also displays a participant information window 420. The participant information window 420 provides the user with information regarding who the participants are, which participants are currently participating and not participating, and the like. For example, current attendance information 422, 424 displays the number of participants currently attending the teleconference and their name 426. An icon 428 may also be provided to uniquely identify a participant or group of participants.

Clickable options 430, 432, 434 allow a user to perform various actions associated with the teleconference. For example, a first clickable option 432 causes the user's communication device to be called as soon as the button 430 is pressed. A second clickable option 432 causes the user's communication device to be automatically called when the teleconference is about to start, is starting, or at any time defined by the user. A third clickable option 434 causes the teleconference to be start when the user clicks the button 434. The user interface 400, in one embodiment, comprises one or more different clickable options and the present invention is not limited to the foregoing description of the user interface 400.

Exemplary Participant Defined Condition Table

Non-Limiting Examples

The foregoing embodiments of the present invention are advantageous because that participants of a teleconference call no longer have to wait connect into the conference call and wait for others to join. Another advantage of the present invention is that the participants are able to visually see the status of the teleconference. Another advantage of the present invention is that participants can define status conditions and connection parameters for being connected to the teleconference. A conference call is not started if the required participants are not available, thereby saving valuable time.

The present invention can be realized in hardware, software, or a combination of hardware and software. A system according to a preferred embodiment of the present invention can be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein.

Embodiments of the invention can be implemented as a program product for use with a computer system such as, for example, the computing environment shown in FIG. 1 and described herein. The program(s) of the program product defines functions of the embodiments (including the methods described herein) and can be contained on a variety of computer readable media. Illustrative computer readable medium include, but are not limited to: (i) information permanently stored on non-writable storage medium (e.g., read-only memory devices within a computer such as CD-ROM disk readable by a CD-ROM drive); (ii) alterable information stored on writable storage medium (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such computer readable media, when carrying computer-readable instructions that direct the functions of the present invention, represent embodiments of the present invention.

In general, the routines executed to implement the embodiments of the present invention, whether implemented as part of an operating system or a specific application, component, program, module, object or sequence of instructions may be referred to herein as a "program." The computer program typically is comprised of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

It is also clear that given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.) It should be appreciated that the invention is not limited to the specific organization and allocation or program functionality described herein.

Each computer system may include, inter alia, one or more computers and at least a computer readable medium allowing a computer to read data, instructions, messages or message packets, and other computer readable information from the computer readable medium. The computer readable medium may include non-volatile memory, such as ROM, Flash memory, Disk drive memory, CD-ROM, and other permanent storage. Additionally, a computer medium may include, for example, volatile storage such as RAM, buffers, cache memory, and network circuits. Furthermore, the computer readable medium may comprise computer readable information in a transitory state medium such as a network link and/or a network interface, including a wired network or a wireless network that allow a computer to read such computer readable information.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method for providing multi-party voice-over-IP services, the method on an information processing system comprising:
   establishing a peer-to-peer distribution tree to broadcast a composite audio signal from a root mixing node to a plurality of participating nodes, wherein a subset of the participating nodes are originating nodes that provide a respective audio stream output received by the root mixing node to produce the composite audio signal, wherein the root mixing node directly receives at least one of audio stream output from a second subset of originating nodes within the participating nodes;
   identifying, independently of the peer-to-peer distribution tree, a first intermediate mixing node from within the plurality of participating nodes, the first intermediate mixing node providing to the root mixing node a mixing of respective audio stream outputs provided by a first subset of originating nodes to the first intermediate mixing node;
   monitoring a processing load on the root mixing node;
   identifying, in response to an increase in the processing load on the root mixing node and independently of the distribution tree, a second intermediate mixing node from the at least one neighbor; and
   assigning, in response to the identifying the second intermediate mixing node, the second subset of originating nodes to the second intermediate mixing node and configuring the second intermediate mixing node to provide a mixing of the at least one audio stream outputs from the second subset to the root mixing node.

2. The method of claim 1, further comprising:
   identifying, independently of the peer-to-peer distribution tree, a backup intermediate mixing node from within the plurality of participating nodes;
   monitoring, at the backup intermediate mixing node, a first status of the first intermediate mixing node; and
   assigning, in response to the first status, the first subset of originating nodes to the backup intermediate mixing node, thereby causing the backup intermediate mixing node to provide a mixing of respective audio stream outputs provided by the first subset of originating nodes to the root mixing node.

3. The method of claim 2, wherein the monitoring the first status comprises receiving a repetitive heartbeat message from the first mixing node, and wherein the assigning is performed in response to a failure to receive the repetitive heartbeat message.

4. The method of claim 2, wherein the first intermediate mixing node provides the mixing of respective audio stream outputs to the root mixing node by data communications through at least one higher level mixing nodes, the method further comprising:

identifying a number of additional backup intermediate mixing nodes, the number of additional backup mixing nodes being dependent upon a number of the at least one higher level mixing nodes through which the mixing is communicated from the first intermediate mixing node to reach the root mixing node.

5. A method for providing multi-party voice-over-IP services, the method on an information processing system comprising:

establishing a peer-to-peer distribution tree to broadcast a composite audio signal from a root mixing node to a plurality of participating nodes, wherein a subset of the participating nodes are originating nodes that provide a respective audio stream output received by the root mixing node to produce the composite audio signal;

identifying, independently of the peer-to-peer distribution tree, a first intermediate mixing node from within the plurality of participating nodes, the first intermediate mixing node providing to the root mixing node a mixing of resrective audio stream outputs provided by a first subset of originating nodes to the first intermediate mixing node;

monitoring a processing load on the first intermediate mixing node and on at least one neighbor node within the participating nodes;

identifying, in response to an increase in the processing load on the first intermediate mixing node and independently of the distribution tree, a second intermediate mixing node from the at least one neighbor; and assigning, in response to the identifying, a portion of the first subset of originating nodes to the second intermediate mixing node and configuring the second intermediate mixing node to provide a mixing of the portion of the first subset of originating nodes to a parent mixing node of the first intermediate mixing node.

6. The method of claim 5, further comprising determining an initiation, at a non-originating node within the participating nodes, of a production of an additional audio stream to be delivered to the first intermediate mixing node for inclusion in the mixing, and wherein the increase in the processing load is a result of the initiating the production of the additional audio stream.

7. The method of claim 5, further comprising:

determining that the combined processing load on the first intermediate mixing node and the second intermediate mixing node each are below a pre-determined threshold; and assigning, in response to the determining that the combined processing load on the first intermediate mixing node and the second intermediate mixing node are below a pre-determined threshold, all originating nodes that are assigned to the second intermediate mixing node to the first intermediate mixing node.

8. A method for providing multi-party voice-over-IP services, the method on an information processing system comprising:

establishing a peer-to-peer distribution tree to broadcast a composite audio signal from a root mixing node to a plurality of participating nodes, wherein a subset of the participating nodes are originating nodes that provide a resrective audio stream output received by the root mixing node to produce the composite audio signal; and identifying, independently of the peer-to-peer distribution tree, a first intermediate mixing node from within the plurality of participating nodes, the first intermediate mixing node providing to the root mixing node a mixing of respective audio stream outputs provided by a first subset of originating nodes to the first intermediate mixing node, wherein the establishing the peer-to-peer distribution tree comprises:

establishing overlay mesh interconnections among the participating nodes;

constructing, at each node within the participating nodes, a respective broadcast tree from the respective node to every other node within the participating nodes;

distributing a respective performance characteristic for each respective broadcast tree to each node within the participating nodes; and performing, at each node within the participating node based upon the respective performance characteristic, an election protocol to determine an optimal root mixing node to be the root mixing node of the peer-to-peer distribution tree.

9. The method of claim 8, further comprising:

accepting a request from a new processing node to become a participating node, wherein the new processing node has been added to the overlay mesh connections and the request is broadcast to at least a portion of the participating nodes;

adding, in response to the request, the new processing node to the peer-to-peer distribution tree;

transmitting, by a first responder from within the participating nodes, a response to the request; and assigning the destination of a new audio stream produced by the new processing node to be a parent mixing node of the first responder.

* * * * *